Jan. 13, 1948. W. P. JOHNSON 2,434,568
SAW CLAMP
Filed Oct. 18, 1946 2 Sheets-Sheet 1
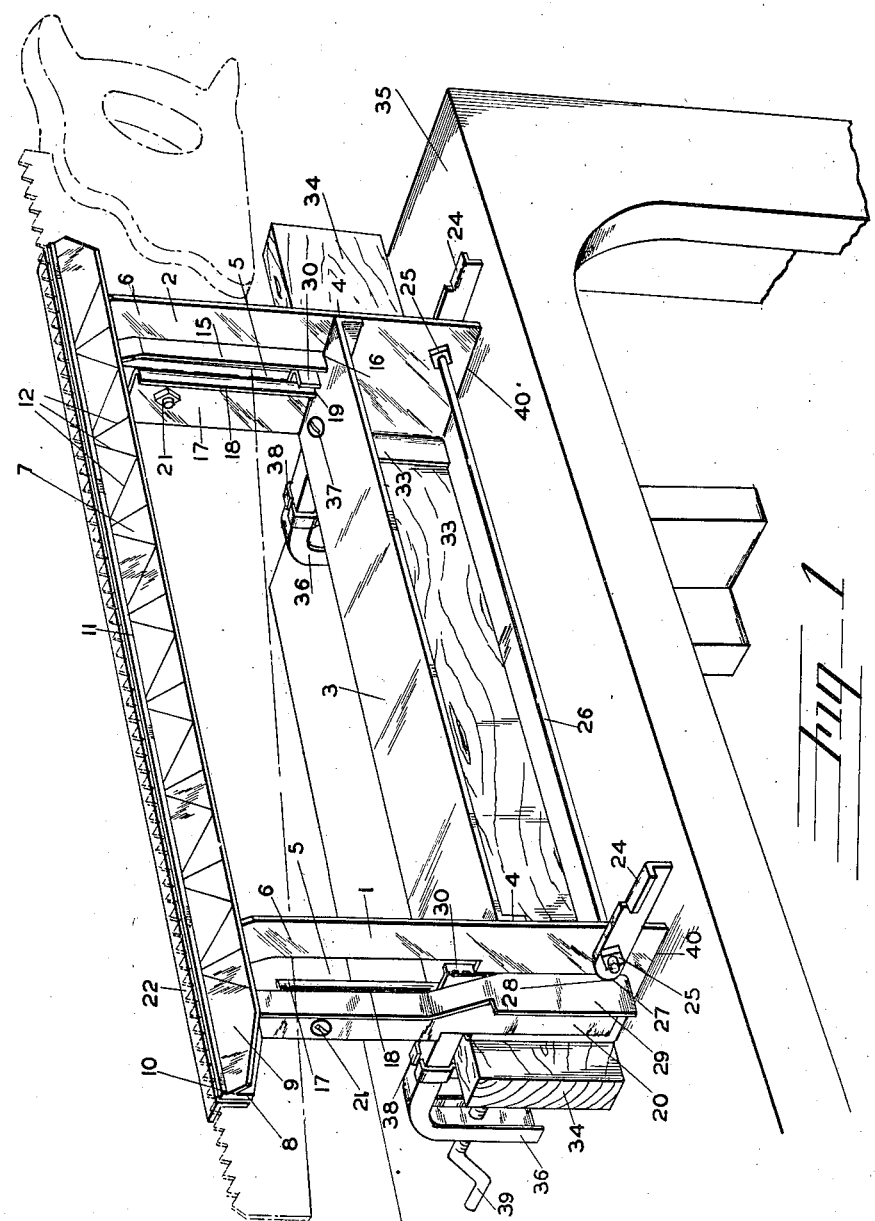
INVENTOR
WILLIAM P. JOHNSON
BY
ATTORNEY Jan. 13, 1948. W. P. JOHNSON 2,434,568
SAW CLAMP
Filed Oct. 18, 1946 2 Sheets-Sheet 2
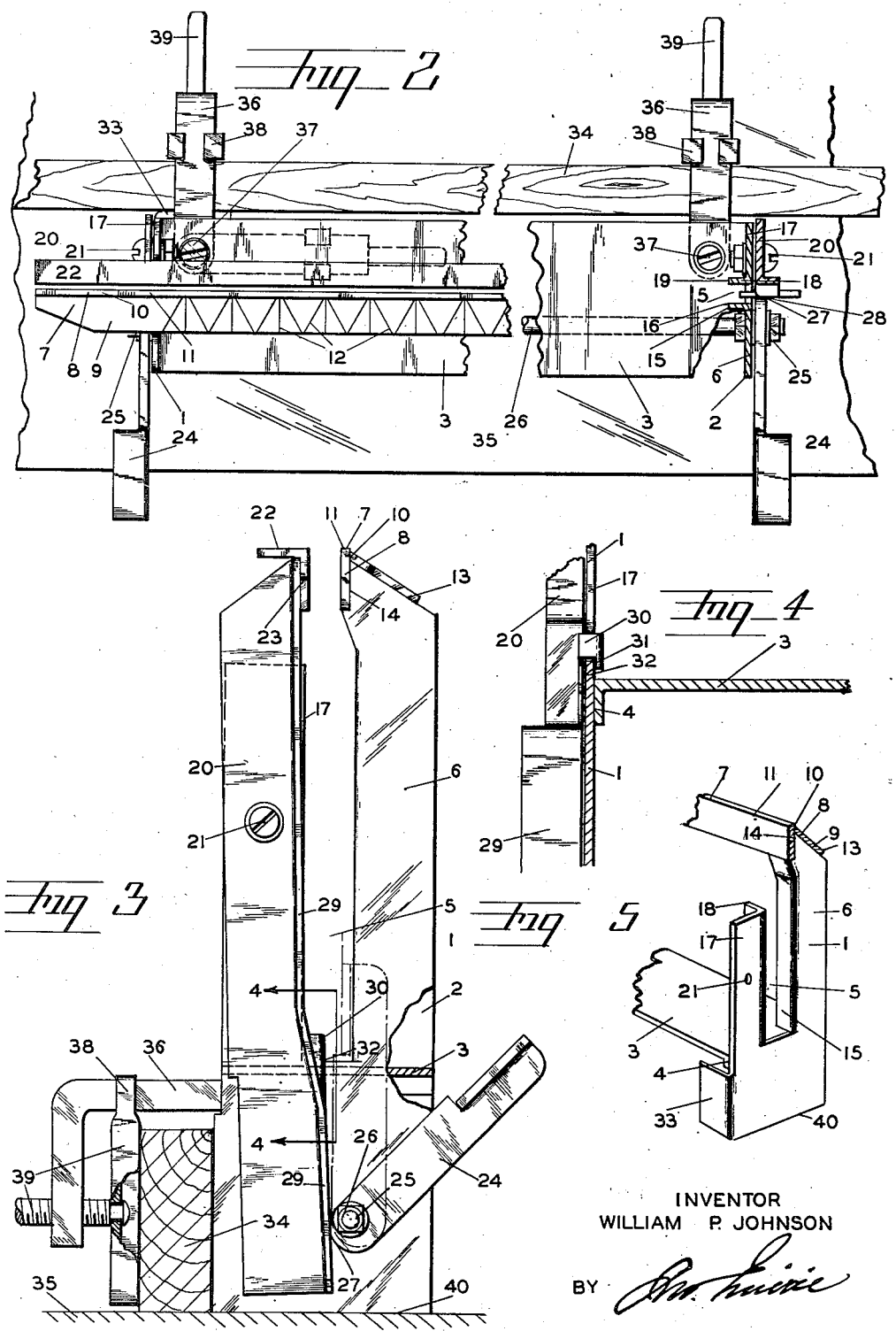
INVENTOR
WILLIAM P. JOHNSON
BY
ATTORNEY Patented Jan. 13, 1948

2,434,568

UNITED STATES PATENT OFFICE 2,434,568

SAW CLAMP

William P. Johnson, Oswego, Oreg.

Application October 18, 1946, Serial No. 703,999

4 Claims. (Cl. 76—78)

This invention relates to saw clamps and is particularly adapted for holding hand saws and the like.

The primary object of the invention is to provide a clamp for holding the saws made from light fabricated metals, as for instance magnesium and the like making the clamp light of weight and strong of structure.

A further object of the invention is to provide a saw clamp that can be folded and put away in the tool kit of the operator.

A still further object of the invention is to provide marking guides engraved on one of the jaws of the clamp for guiding the path of the file.

These and other incidental objects will be apparent in the drawings, specification and claims.

Referring to the drawings:

Figure 1 is a perspective view of my new and improved saw clamp mounted to a supporting table and indicating the position of the saw within the clamp by broken lines for convenience of illustration.

Figure 2 is a plan view, parts broken away for convenience of illustration of Figure 1.

Figure 3 is an end view of the clamp mounted upon the table with the jaws swung part way open, parts broken away for convenience of illustration.

Figure 4 is a detailed fragmentary sectional view taken on line 4—4 of Figure 3.

Figure 5 is a perspective detail of one end of the framework of the clamp, partially in section.

In the drawings:

My new and improved saw clamp consists of a frame comprising vertical ends 1 and 2 tied together by the horizontal plate 3. The plate 3 being preferably welded to the end structures 1 and 2 at 4, as for instance spot welding. The end frames 1 and 2 are bifurcated at 5, the upright arms 6 providing for the mounting of the jaw 7.

The jaw 7 consists of a horizontal vertical cross bar 8 and an inclined cross bar 9 secured to the cross bar 8 at 10 by welding or other suitable means. This provides a lip 11 extending up above the surface of the cross bar 9 providing for close observation of the saw. The inclined bar 9 has markings 12 engraved thereon providing a guide for the operation of the file through the teeth of the saw. Both the cross bars 8 and 9 are secured to the upright arms 6 by welding or other suitable means at 13 and 14.

Right angle bends 15 are formed on the arms 6 and welded to the cross plate 3 at 16, providing strength and rigidity to the arm. The upright arms 17 also have right angle bends 18 welded to the cross bar 3 at 19, providing for said rigidity. The upright arms 17 are rigid of structure and provide a support for the pivotally mounted arms 20. The arms 20 are pivotally mounted at 21 to the uprights 17. Mounted on their upper ends is a saw holding clamp bar 22 which consists of a right angle bar. This bar is welded at 23 to the upper ends of the arms 20, this provides for the clamping jaw of the clamp assembly.

Eccentric arms 24 are pivotally mounted at 25 to the cross rod 26 anchored to the lower ends of the end frames 1 and 2 best illustrated in Figures 1 and 3. These arms have eccentrics 27 formed on their pivotally mounted ends which contact the lower ends 28 of the pivotally mounted arms 20. Right angle bends 29 are formed on the arms 20 and provide for rigidity of the arms and a place for the eccentrics 27 to contact. The arms 20 are further held in alignment by the turned out portions 30, which are bifurcated at 31 overlapping the end members at 32 bridging between the upright 6 and the upright 17. This prevents the lower ends 28 of the arms 20 from being sprung outwardly in the operation of the clamp.

Right angle bends 33 are formed on the lower ends of the frames 1 and 2 and form one of the jaws of the clamp for holding the saw to the supporting element, as for instance the member 34 forming part of the table 35. The above said clamp consists of a right angle jaw member 36 pivotally mounted at 37 to the cross bar 3. A floating clamp member 38 is forced against the supporting member 34, best illustrated in Figures 1, 2 and 3. This assembly is of well known construction with the exception that I pivotally mount the same as stated above at 37 so that the clamp can be swung to the broken line position as indicated in Figure 2 while the saw clamp is not in use. This is one of the features of my invention.

I will now describe the operation of my new and improved saw clamp. The clamping jaw members 36 are unfolded from the dotted position as shown in Figure 2 and applied to any suitable support, as for instance the support 34 and the cranks 39 are operated in the usual manner setting the movable jaw 38 against the supporting member 34 and the stationary jaw member 33. The bottom ends 40 of the end frames 1 and 2 rest on the table 35. This provides for a rigid support for the entire clamp assembly. The eccentric arms 24 would normally be folded to the broken line position providing freedom of operation of the clamp 23 so that the saw can be inserted therein best illustrated in Figure 3.

When the saw has been put in place the arms 24 are lowered to the position shown in Figure 1 causing the eccentrics 27 to bear against the lower ends 28 of the pivotally mounted arms 20 bringing the jaws 8 and 23 of the saw clamp tightly against the saw. The operator applies his file to the teeth following whatever selected indicator line he desires as indicated by the lines 12 on the sloping bar 7.

I do not wish to be limited to the exact mechanical detail as shown, as other mechanical equivalents may be substituted still coming within the scope of my claims.

I claim:

1. A saw clamp comprising a frame, the ends of which are bifurcated, a fixed clamping bar connected to the upper ends of the bifurcated ends of the frame, movable arms pivoted to the ends of the bifurcated frame, said arms having one side edge bent outwardly to form strengthening ribs, lugs extending from the arms to and between the bifurcated ends of the frame to prevent lateral bending of said arms, a clamping bar secured to the upper ends of the arms, and a pair of levers pivotally mounted on the ends of the frame, said levers having cams formed on their inner ends to engage the ribs on the arms to actuate the clamping bar carried by the pivoted arms.

2. A saw clamp, comprising a frame including a horizontal plate, end members secured to the ends of the horizontal plate and extending upwardly therefrom, that portion of the end members above the horizontal plate being divided to provide spaced arms, one member of a saw clamp mounted at the upper end of one arm of the end members, the other arm of each of said members terminating short of the first-mentioned arm, a saw clamp carrying section pivotally mounted on said upright of shorter length, a saw clamp member for cooperation with the first-mentioned saw clamp to fix the saw for operation, the pivoted section carrying the moving saw clamp member moving the respective saw clamps relative to each other for clamping and releasing the saw, levers pivotally connected to the end frames and movable to engage and fix the pivotally connected saw clamp carrying section to compel clamping cooperation of the saw clamps, the saw clamp moving section at each end of the frame having guiding means cooperating with one of the end arms to prevent lateral displacement of the movable saw clamp carrying element in operation by the levers.

3. A construction as defined in claim 2, wherein the end frames are provided adjacent the inner edges of the bifurcation with inwardly extending bracing sections, the lower ends of which are rigidly secured to the horizontal plate.

4. A construction as defined in claim 2, wherein the levers for operating the movable saw clamp member are pivotally mounted upon a shaft extending beneath the horizontal plate and through the end frames below that plate, the operative end of each lever having an eccentric edge to create increasing pressure on the movable saw clamp carrying section as the lever is moved in one direction.

WILLIAM P. JOHNSON.

REFERENCES CITED

The following references are of record in the file of this patent:

UNITED STATES PATENTS

| Number | Name | Date |
|---|---|---|
| 373,148 | Marsh | Nov. 15, 1887 |
| 510,846 | Disston | Dec. 12, 1893 |
| 778,605 | Potter | Dec. 27, 1904 |
| 918,338 | Ljung | Apr. 13, 1909 |
| 1,196,772 | Gaede | Sept. 5, 1916 |
| 1,263,652 | Davis | Apr. 23, 1918 |
| 1,324,594 | Huggins | Dec. 9, 1919 |
| 1,475,351 | Phillips | Nov. 27, 1923 |
| 1,507,501 | Miller | Sept. 2, 1924 |
| 1,676,188 | Hugus | July 3, 1928 |